Figure 2:
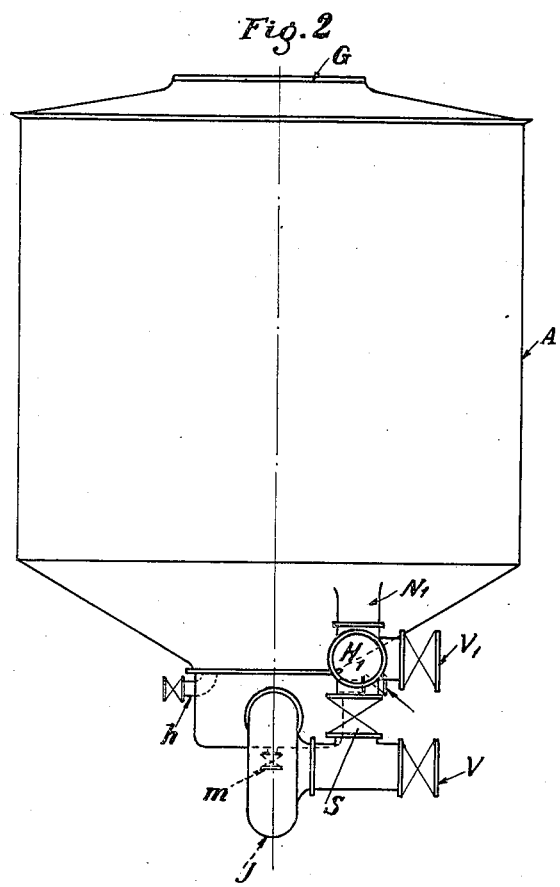

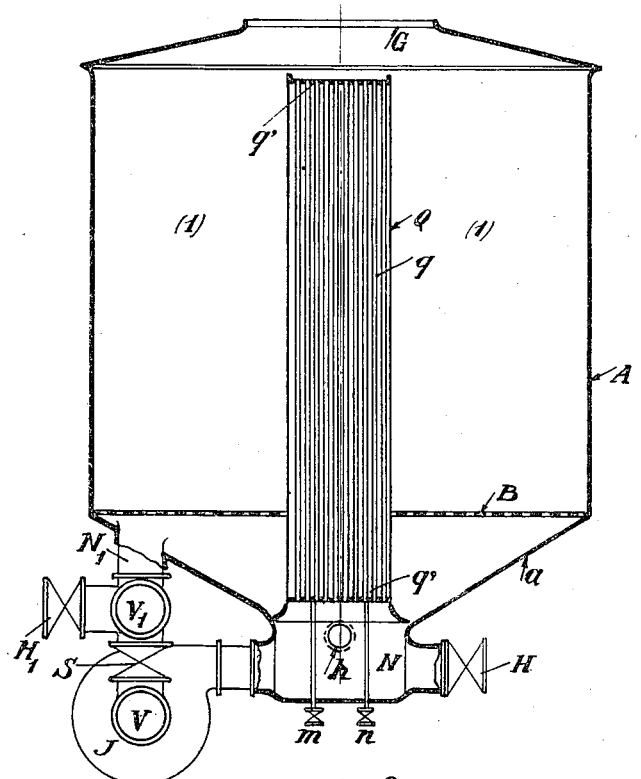
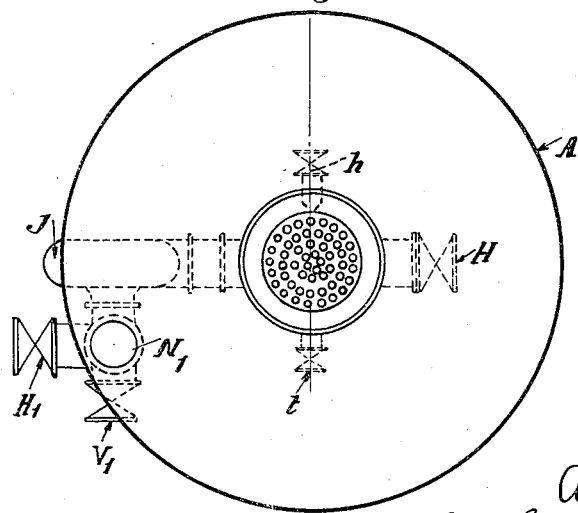

Nov. 7, 1933.  A. GODEL  1,934,301
METHOD OF RECOVERING VOLATILE SUBSTANCES
Filed Aug. 13, 1928  2 Sheets-Sheet 2

Inventor:—
Albert Godel,
By:- Smith and Michael,
Attorneys.

Patented Nov. 7, 1933

1,934,301

UNITED STATES PATENT OFFICE 1,934,301

METHOD OF RECOVERING VOLATILE SUBSTANCES

Albert Godel, Paris, France, assignor to Societe De Recherches & d'Exploitations Petroliferes, Paris, France, a French joint-stock company Application August 13, 1928, Serial No. 299,440, and in France August 30, 1927

2 Claims. (Cl. 252—4)

This invention relates to the separation and recovery of gases and vapors by solid absorbents.

In the process for the recovery of volatile solvents by the aid of absorbent materials, described in my co-pending patent specification 118,007 filed June 23rd 1926, the operation is generally carried out in several periods or phases, namely:—

The absorption stage, by the passage of the gases to be treated over the absorbent until sufficient saturation is obtained.

The preheating of the absorbent.

The distillation by injection of steam.

The drying of the absorbent by the gas to be treated, gas already treated, hot air or superheated steam.

The cooling of the absorbent by gas to be treated, gas already treated, or cold air, with or without the aid of cooling coils embedded in the mass of the absorbent.

The present invention has for its object the better utilization of the process and apparatus described in my said co-pending patent specification and more particularly of the improved or modified apparatus described in my co-pending patent specification No. 214,102 filed August 19th 1927, the present invention providing a novel method of and means for the drying and cooling of the absorbent under particularly favorable conditions.

It has been noticed that the means for the drying and cooling of the absorbent as mentioned above and as carried into practical use, do not provide a thoroughly satisfactory yield in the extraction of the solvent. This depends on the fact that even at the temperature of 150° C. or higher, at which the operation of distillation is completed, the absorbent still retains by its retentivity a considerable fraction of the solvent absorbed; for active carbon, this fraction may reach 10% or even 20% of the weight of the active carbon itself.

Now inasmuch as the hot absorbent is thereafter subjected to a current of gas or air, the greater part of this residue is carried over, leading to a considerable loss of solvent.

This drawback is completely suppressed, according to the present invention, by the drying and cooling of the absorbent material by means of gas circulating in a closed circuit in the interior of the absorber, this gas being cooled at any point of the circuit in any suitable manner, by means, for example, of cooling surfaces or of a cooling liquid.

In this novel method of operation, as the absorbent is cooled from the upper layer downwards, any retained solvent evaporating from the still hot lower layer of the absorbent is reabsorbed by the cool upper layer and the aggregate amount of solvent retained by the absorbent is unchanged, i. e. remains constant.

There may in some cases be an advantage in constructing the internal cooling surfaces or elements in such a way as to permit the elimination of the small drops or mist produced by the cooling of the moist gas in the closed circuit; there will thus be secured an effective drying of the absorbent at the same time as its cooling. It may likewise be an advantage to bring the gas at one point of the circuit into direct contact with atomized cold water for example.

Lastly, a modification consists in providing a closed circuit for the gas between a hot absorber undergoing the cooling of the absorbent materials and a cold absorber in which the saturation stage has taken place.

The heat units derived from the hot absorber will serve for the preheating of the cold absorber, but of course the circulation of the gases must not be carried beyond the point where this preheating might lead to a commencement of the distillation of the solvent. Experiments have shown that, while observing this limit, there can be produced at the same time a satisfactory cooling of the hot absorber and a very effective preheating of the saturated absorber. There is thus provided economy of heating together with economy of cooling.

The accompanying drawings represent by way of example two methods of carrying out the invention.

Figures 1, 2 and 3, which are identical with the corresponding figures of my co-pending patent specification Serial No. 214,102, relate to an absorber apparatus containing an internal cooling element for carrying out the cooling and drying of the absorbent, Figure 1 being a vertical axial section, Figure 2 an elevation at right angles to Fig. 1, and Figure 3 a plan view with the cover and the supporting grating for the absorbent removed.

Figure 4:
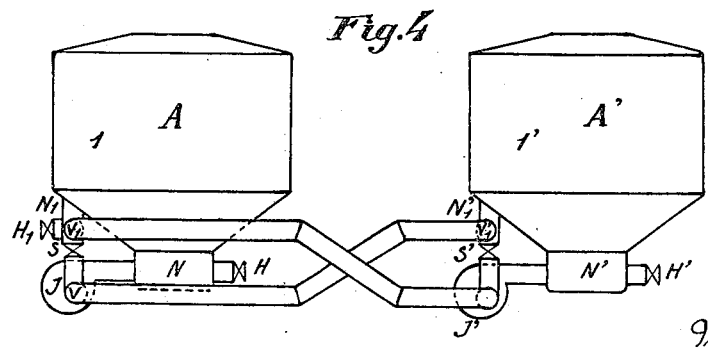

Figure 4 represents diagrammatically the combination of two absorbers, of which one is at the cooling stage and the other is at the preheating stage.

The absorber with internal cooling means, Figures 1 to 3, is constituted by a vessel A, preferably in the form of a cylinder, with a frustoconical bottom $a$, pressure-tight to gas or steam and intended to contain the absorbent material.

This material is arranged upon a grating B forming a false bottom and cut away at its centre to allow passage for a vertical cylindrical chamber Q, concentric with the vessel A, containing a nest of tubes $q$ connected at each end of a tubeplate $q'$ and resting upon a header N attached to the bottom $a$.

The nest of tubes $q$ provides communication between the header N, which has a valve H for the supply of gas, and the space above the upper surface of the absorbent material.

The cover of the vessel A may be detachable or be simply provided with a manhole G of a diameter sufficient for the withdrawal of the cylindrical chamber Q. The side wall of the vessel A can likewise be provided with one or more manholes, not shown in the drawings, in order to allow the removal of the absorbent material.

The bottom $a$ carries near its outer rim a pipe junction $N_1$ giving access by a four-way union:— (1) to the gas exit, by way of valve $H_1$; (2) to the air exit, by way of the valve $V_1$; (3) to the fan J, by means of a valve S for controlling the circulation, this fan delivering into the header N.

At V there is arranged a valve for the admission of air to the pipe or T-piece connecting the valve S with the fan J.

The heating of the nest of tubes $q$ is obtained by means of steam admitted into the space surrounding the tubes, the steam entering at $m$ into a pipe extending up through the lower tubeplate $q'$ and being drained off or discharged at $n$ by another pipe extending down from the lower tube-plate; the cooling is effected by means of cold water circulating in the opposite direction.

The use of the apparatus described above in the stages of absorption, preheating and distillation by steam, is known and the description of its operation during these stages does not come within the scope of the present invention.

The valve-fitted pipe $h$ leading to a refrigerating condenser (not shown) serves for the discharge of the absorbed products which are usually given off at or about the beginning of the distillation. The branch pipe $t$ upon the header N serves for the introduction of steam during the distillation in order to assist or to complete the distillation of the absorbed solvent. During the period of preheating of the saturated mass by exchange of temperature by the closed circuit circulation of the drying gases coming from the hot mass which is being dried and cooled, the pipes $h$ and $t$ have their valves shut so as not to affect the operation of the closed circuit.

Once the phase of steam distillation is terminated, the next step is the drying and cooling of the mass, which is effected according to the present invention by utilizing a closed circuit of gas circulating within the absorber and cooled by passage through the tube nest $q$. For this purpose there is produced through the pipes $m$ $n$ a circulation of cold water into the space surrounding the tube $q$, and the fan J is started while the circulation valve S is opened, so that the gas contained in the apparatus travels round the closed circuit formed by the fan J, header N, tube nest $q$, absorbent mass 1, pipe junction $N_1$, valve S and fan J.

In this closed circuit, the gas descending through the hot absorbent mass takes up moisture and heat therefrom, and after passing through the fan J it ascends through the pipes $q$ cooled by the cold water circulation; heat is thereby abstracted from the ascending gas, and the moisture condensing upon the interior of the tubes $q$ runs down into the header N, from which it may be discharged from time to time. The cooled and dried gas then descends once more through the hot absorbent mass, taking up further heat and moisture therefrom, and being again cooled and dried in the tubes $q$.

In order to obviate the development during this phase, due to the condensation of steam, upon the tubes of the nest $q$, of a vacuum prejudicial to the apparatus, the valve V may be held partly open for example and a small quantity of air admitted to the interior until the atmospheric pressure is re-established inside the absorber. The valve H might likewise be held partly open in order to admit in the same way a small quantity of the gas to be treated.

When the cooling is completed, the cycle of operations is then terminated and the absorber is ready for a fresh absorption stage.

In Figure 4 there are represented two absorbers of the above type, but with the connections necessary in order to provide for the cooling of the carbonaceous material contained in one of the absorbers, in accordance with the present invention, while effecting the preheating of the carbonaceous material contained in the other absorber.

For this purpose the valve V of the absorber A is connected to the valve $V_1'$ of the absorber A' and the valve $V_1$ of the absorber A to the valve V' of the absorber A'.

Thus in order to carry out the cooling, it will suffice to start up the fans J and J', and while the valves S and S' are closed to open the valve V $V_1$ and V' $V_1'$. Thus the gases will travel in a loop or closed circuit around the path from fan J, header N, mass 1, tube $N_1$, valve $V_1$, valve V'; fan J', header N', mass 1', tube $N_1$, valve $V_1'$, valve V, to fan J.

It is furthermore possible in accordance with the invention to combine two or more of the methods described above for carrying out the drying and cooling of the absorbent.

What I claim is:

1. In the recovery of volatile substances by solid absorbent materials contained in an absorber, a method of obviating the loss of the volatile substances retained by the absorbent after distillation, during the step of drying and simultaneously cooling the hot absorbent material, characterized by the fact that the drying and cooling are effected by gas circulating in a closed circuit, said gas being cooled at a point in said circuit in the interior of the absorber and then conveyed back to said absorbent material.

2. In the recovery of volatile substances by solid absorbent materials contained in an absorber, means for drying and cooling the heated absorbent while obviating loss of the volatile substances retained thereby after regeneration, said drying and cooling being effected by gas circulating in a closed circuit and cooled at a point in said circuit in the interior of the absorber by contact with cooling means.

ALBERT GODEL.